E. B. HESS AND L. C. MYERS.
MARGIN SCALE FOR TYPEWRITING MACHINES.
APPLICATION FILED MAY 27, 1921.

1,417,903.

Patented May 30, 1922.

Inventors
Edward B. Hess
Lewis C. Myers
by their Attorneys

UNITED STATES PATENT OFFICE.

EDWARD BERNARD HESS AND LEWIS CARY MYERS, OF BROOKLYN, NEW YORK, ASSIGNORS TO ROYAL TYPEWRITER COMPANY, INC., OF NEW YORK, N. Y.

MARGIN SCALE FOR TYPEWRITING MACHINES.

1,417,905.  Specification of Letters Patent.  Patented May 30, 1922.

Original application filed January 13, 1921, Serial No. 436,924. Divided and this application filed May 27, 1921. Serial No. 473,162.

*To all whom it may concern:*

Be it known that we, EDWARD BERNARD HESS and LEWIS CARY MYERS, both citizens of the United States, residing in Brooklyn, in the county of Kings, city and State of New York, have invented certain new and useful Improvements in Margin Scales for Typewriting Machines, of which the following is a specification.

In our application for patent filed Jan. 13, 1921, No. 436,924, we have shown all of the mechanism of a typewriting machine embodying various improvements made by us. The present application for patent is a division of said application filed Jan. 13, 1921, and the claims herein are confined to certain scales employed in the machine.

The paper table is formed on one side with a depression in which is mounted a scale plate which is adjustable crosswise of the table. The guide for the margin of the paper is adjustable transversely of the table and may be set at any desired position, which position will be indicated on the scale of the paper table and on the scale of the margin stop rail. In this way, means is provided whereby the margin may be quickly adjusted by devices in plain view and within easy reach of the operator in a machine in which the margin stops and their supporting rail are mounted in rear of the platen and in rear of the paper table.

In the accompanying drawings:—

Figure 1:
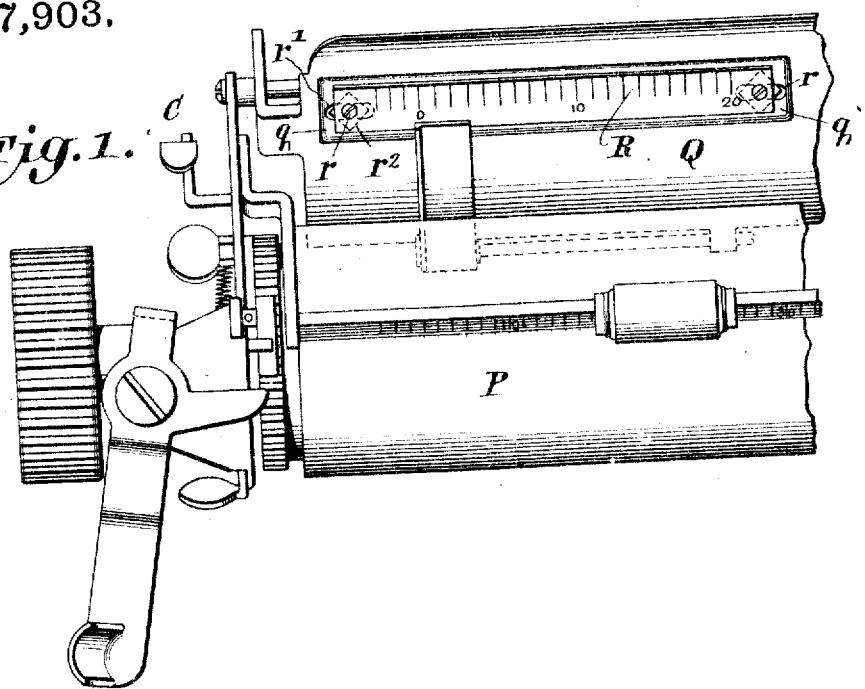
Figure 1 is a view on enlarged scale showing a portion of the platen, the paper table with our improvements applied, and part of the line-space mechanism.
Figure 2:
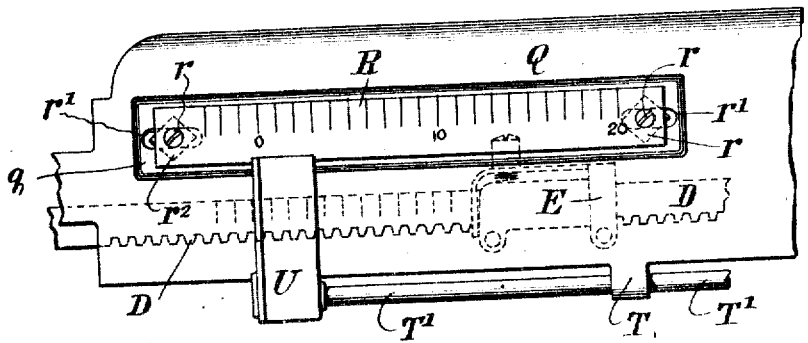
Figure 2 shows a portion of the paper table with our improved adjustable scale thereon and it also shows how the guide for the margin of the paper is supported. The margin stop rail and one of the margin stops is indicated by dotted lines.
Figure 3:
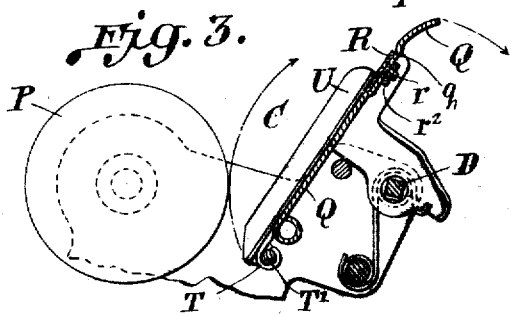
Figure 3 is a detail view, in section, showing particularly how the margin scale is mounted and adjusted on the table.

The drawings show a portion of a paper table Q carrying an adjustable scale plate R, provided with proper graduations as indicated. The plate is located in a depression $q$ in the table and carries studs $r$ extending through slots $r'$ in the table and carrying nuts $r^2$. In this way the scale plate is located below the plane of the table and forms no obstruction to the paper, and means is also provided for giving the plate a delicate adjustment to conform to other scales on the machine. It has heretofore been proposed to provide a margin scale on the paper table but the custom heretofore has been to print the scale on the table by a transfer process. It has been found that such a scale becomes blurred, scratched or otherwise marred and is not sufficiently accurate. These objections have been overcome by our improvements.

In front-strike visible typewriting machines where the carriage structure and its tracks or guide rails and the margin stops are located behind the line of print and behind the paper table, the stops are not so readily accessible for frequent adjustments as they are in some machines where the stops are located in front of the line of print, although such machines have objectionable features not present in machines where the margin stops and their rail are removed from the front of the machine so as to leave a clear space in front of the line of print. We have provided means whereby the margin may be quickly adjusted by devices in plain view and within easy reach of the operator in a machine in which the usual margin stops and their supporting rail are mounted in rear of the platen and the paper table so that all of the advantages of a machine of this type are preserved, while the facility with which the margin of the paper may be adjusted is greatly enhanced, making it possible to adjust the margin of this type of machine as easily as in machines where the margin stops are arranged in the front part of the machine.

In setting the margin stops it is customary to place the left-hand stop at zero position on the margin scale so that upon each return of the carriage it rests at that point.

According to our invention the stop is placed at a predetermined position on the indicating scale other than the normal zero position. This position normally brings the carriage, on its return, to a predetermined position which leaves a margin at the left-hand side of the paper equal to the distance between the margin stop position and the left-hand edge of the paper.

In order to adjust the margin within these limits, when it is desired to vary the margin as the printing progresses, we effect the control by an adjustable paper gauge on the table, the position of which gauge may be easily changed and it co-operates with the scale on the table.

The table is provided with a tubular extension T which serves as a bearing or support for a rod T' which is adjustable endwise in the bearing. The rod carries a paper guide U which overlies the left-hand portion of the table below or in front of the scale R. The guide U may be adjusted transversely over the table along the scale R and held in the desired or selected position. The relation of the scale R and the guide U to the graduated margin stop rail D and the adjustable stop E, is indicated in Fig. 5.

Assuming the margin stop to be in a predetermined position, say at 15 on the scale, and the paper gauge or guide U is at its extreme left-hand limit on the table, a desired margin may be obtained by moving the guide U to the right on the table until it coincides, for instance, with the Figure 5 on the scale R. The margin is thus reduced five spaces and if the guide be moved to 10, or some other position on the scale, the margin becomes correspondingly reduced. It will, therefore, be seen that by means of the margin stop (located at a predetermined position) paper table, scale and paper guide carried by the table, the margin control of the printing point is effected by the adjustments of the paper relatively to the paper guide in contradistinction to the usual practice of inserting the paper and allowing the margin stop in its normal zero position to control the location of the paper. It will also be observed that our invention contemplates the adjustment of the paper guide on the table rather than adjustments of the margin stop for variable margins.

We claim as our invention:

1. A paper table for typewriting machines carrying a guide rod at its lower end, and a depressed portion in its upper surface entirely below its upper edge, a scale mounted for adjustment in said depressed portion, and a paper guide supported by the rod, said guide cooperating with the scale and adjustable endwise thereof.

2. A paper table for typewriting machines carrying a guide rod at its lower end, and held away from its lower edge, an adjustable scale carried by the table and extending part way across it, a paper guide supported by the rod co-operating with the scale and movable endwise thereof.

3. A paper table having a depressed portion near its upper edge and an extension beyond its lower edge, a relatively short scale adjustably mounted in said depressed portion, and a side edge gage adjustably carried by said extension and extending upward to a position adjacent said scale.

4. A paper table having a depressed portion near its upper edge and an extension beyond its lower edge, a short scale mounted for endwise adjustment in said depressed portion and lying flush with the face of the table, a rod mounted in said extension and an endwise adjustable side edge gage carried thereby and extending upward to a position adjacent said scale.

5. In a typewriting machine, a paper table having a recessed portion below its upper edge and an extension at its lower edge adjacent the platen, an adjustable scale in said recessed portion, a rod carried by said extension, a paper gage supported at its lower edge by said rod and cooperating at its upper edge with said scale, and an adjustable margin stop for positioning the carriage, whereby the relative positions of the paper and the carriage may be quickly predetermined.

6. In a typewriting machine, the combination of a fixed scale, a margin stop adjustable relatively thereto for positioning the carriage, a paper table carried by the carriage having a depressed portion entirely below its upper edge and an extension at its lower edge adjacent the platen, an adjustable scale in said depressed portion, a rod carried by said extension, a paper gage supported at its lower edge by said rod and co-operating at its upper edge with said scale, whereby the relative positions of the paper and the carriage may be quickly and accurately predetermined.

In testimony whereof, we have hereunto subscribed our names.

EDWARD BERNARD HESS.
LEWIS CARY MYERS.